United States Patent [19]

Mathur

[11] Patent Number: 4,768,346
[45] Date of Patent: Sep. 6, 1988

[54] DETERMINING THE COEFFICIENT OF PERFORMANCE OF A REFRIGERATION SYSTEM

[75] Inventor: Anoop K. Mathur, Shoreview, Minn.

[73] Assignee: Honeywell Inc., Minneapolis, Minn.

[21] Appl. No.: 89,712

[22] Filed: Aug. 26, 1987

[51] Int. Cl.$^4$ ............................................. F25B 49/00
[52] U.S. Cl. .............................. 62/127; 364/551.01; 165/11.1
[58] Field of Search ................. 62/125, 126, 127, 129; 165/11 R; 236/94; 364/551, 557, 506, 511; 374/39, 40, 41, 31; 73/112

[56] References Cited

U.S. PATENT DOCUMENTS

| | | | |
|---|---|---|---|
| 4,217,761 | 8/1980 | Cornaire et al. | 165/11.1 X |
| 4,325,223 | 4/1982 | Cantley | 62/127 X |
| 4,432,232 | 2/1984 | Brantley et al. | 62/127 X |
| 4,510,576 | 4/1985 | MacArthur et al. | 364/551 |
| 4,611,470 | 9/1986 | Enström | 62/127 |

Primary Examiner—Harry B. Tanner
Attorney, Agent, or Firm—C. G. Mersereau; W. B. Easton

[57] ABSTRACT

The disclosure involves a coefficient-of-performance (COP) diagnostic method involving the use of novel algorithms for determining performance manifested faults of vapor compression type refrigeration systems.

5 Claims, 1 Drawing Sheet

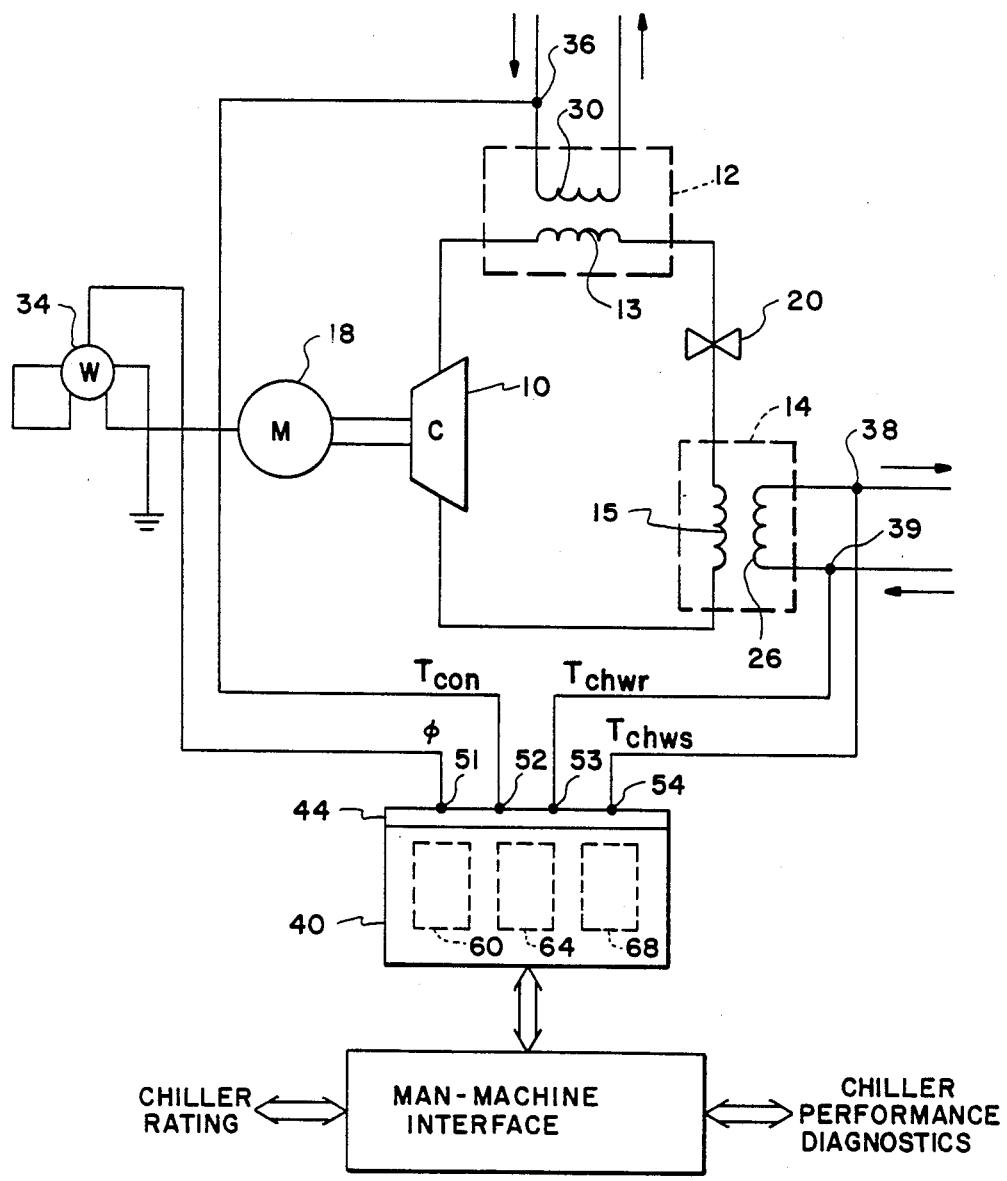

DETERMINING THE COEFFICIENT OF PERFORMANCE OF A REFRIGERATION SYSTEM

This invention relates to a coefficient-of-performance (COP) diagnostic method involving the use of novel algorithms for determining performance manifested faults of vapor compression type refrigeration systems. Such systems are also referred to herein as centrifugal chillers.

The COP algorithms are a set of parametric algebraic equations that use a minimal set of measurements to determine whether performance degradation (fault) exists in a chiller. The equations normalize the effect of changes on COP due to variations in condenser temperature, evaporator temperature and load from the normal or design conditions.

A main object of the invention is to provide algorithms that are applicable to any size chiller without having to change the parameters of the parametric equations.

Other objects and advantages of the invention will become apparent from the following specification, appended claims and attached drawing.

The drawing shows a schematic diagram of a vapor compression system of the type to which the coefficient of performance diagnostic method of the present invention is applicable.

The vapor compression system shown in the drawing is a refrigerant fluid circuit which comprises a series arrangement of a compressor 10, a condenser unit 12 having a coil 13, and an evaporator unit 14 having a coil 15. The system includes an electric motor 18 for driving the compressor and an expansion valve 20 on the upstream side of the evaporator coil 15.

A coil 26 in evaporator unit 14 is in heat exchanging relation to evaporator coil 15 and is utilized for the cooling load which may be a flow of water to and from the coil 26.

A coil 30 in condenser unit 12 is in heat exchanging relation to condenser coil 13 and a flow of a fluid such as water to and from the coil 30 is utilized to extract heat from the refrigerant flowing in coil 13. Coil 30 may be connected to a cooling tower or to some other means for extracting heat from the fluid flowing out of coil 30.

A wattmeter 34 in the power line to the motor 18 measures the power supplied to the system. A sensor 30 monitors the temperature ($T_{cond}$) of the inlet of the condenser cooling water supply for the condenser unit 12. Sensors 38 and 39 monitor the temperatures ($T_{chws}$ and $T_{chwr}$ of the supply) and return lines of the load water chilled in the evaporator unit 14.

A microcomputer 40 is provided which may be loaded with a program which incorporates the algorithms described herein to determine the performance manifested faults of the illustrated refrigeration system.

An interface 44 for the microcomputer has four input terminals 51, 52, 53 and 54 connected respectively to the wattmeter 34, sensor 36 and sensors 38 and 39. The microcomputer includes computing means 60 such as a microprocessor and data storage means 64 such as a ROM. The microcomputer 40 also has a program storage facility 68 which may be RAM.

The measured inputs for the algorithms are power consumption ($\phi$) indicated by the wattmeter 34, chilled water inlet and outlet temperatures ($T_{chws}$ and $T_{chwr}$) from the sensors 38 and 39, and the condenser water temperature ($T_{cond}$) from the sensor 36. In general, these temperatures are used to calculate the cooling load ($Q_c$), assuming the chilled water flow rate through coil 26 is constant.

When microcomputer 40 is programmed with the algorithms herein it serves as an integrated chiller performance degradation monitor which "learns" the expected chiller performance map over a short period of time when the chiller is in "good" working condition. It uses this map periodically thereafter as a baseline to detect any performance degradation which might subsequently occur. The programmed computer monitor utilizes the four minimum measurements referred to above and computes the design performance of a chiller in an integrated manner using the algorithms herein. The sensitivity of the monitor enables it to determine performance degradation when such degradation exceeds 8 to 10 percent.

The first step of the method is to determine what the COP would be at full load conditions when the system is in good working condition. This requires the calculation of the available capacity at the given temperature conditions.

Before proceeding with the equations and the explanations thereof, it is to be noted that variables having the designation D (which stands for design) such as $T_{cond,D}, T_{chw,D}$ and $CAP_D$ are design specifications set forth in manufacturer's catalogs for particular models of chillers. These "design" specifications are stored in the data storage section 64 of the computer 40 and are incorporated into the programs for the algorithms.

Referring now to the equations, the first step is to calculate what the COP of the chiller being monitored would be at full-load conditions. This involves calculating the available capacity (AVCAP) at the existing temperature conditions from the input data read from input terminals 51 to 53.

A reduced temperature used in the calculation is as follows:

$$T_r = (T_{con} - T_{con,D})/\alpha_{temp} - (T_{chw} - T_{chw,D}) \quad (1)$$

where:
$T_{con}$ = condenser temperature,
$T_{con,D}$ = condenser temperature at design,
$T_{chw}$ = chilled water temperature,
$T_{chw,D}$ = chilled water temperature at design.

The constant, $\alpha_{temp}$, is the ratio of the required change in condenser temperature to a unit change in chilled water temperature to maintain the same rated capacity. Analysis of some chiller data has shown that $\alpha_{temp}$ is approximately constant and an average value of 2.545 is a good approximation.

An empirical algebraic expression of the following form was found in order to calculate the ratio ($\beta_{cap}$) of the available capacity (AVCAP) at the actual chilled water and condenser water conditions to the design capacity ($CAP_D$):

$$\beta_{cap} = b_1 + b_2 * T_r + b_3 * T_r^2 \quad (2)$$

$$CAP = \beta_{cap} * CAP_D \quad (3)$$

The part-load ratio (PLR) is thus:
$$\Gamma_{load} = Q_c / CAP \quad (4)$$

where:

$$Q_c = (\text{chilled water flow}) * (T_{chw,in} - T_{chw,out}) \quad (5)$$

The full-load power (PFL) is calculated from yet another quadratic empirical expression as follows:

$$\delta_{pow} = a_1 + a_2 * \Gamma_{load} + a_3 * (\Gamma_{load})^2 \quad (6)$$

$$PFL = \phi * \delta_{pow} \quad (7)$$

$\delta_{pow}$ is a fraction of full-load and $\phi$ is the measured power consumption.

The COP actual (COPA) at full load and given temperature conditions is:

$$COPA = CAP/PFL \quad (8)$$

The next step is to normalize the full-load COP from actual temperature conditions to the design temperature conditions. This is done using Carnot COPs as follows:

$$COP1 = (T_{con} + 460)/(T_{con} - T_{chw}) \quad (9)$$

$$COP2 = (T_{con,D} + 460)/(T_{con,D} - T_{chw,D}) \quad (10)$$

$$\Psi_{cop} = COP1/COP2 \quad (11)$$

$$\theta_{norm} = c_1 + c_2 * \Psi_{cop} + c_3 + (\Psi_{cop})^2 \quad (12)$$

$$COPAD = COPA/\theta_{norm} \quad (13)$$

where:
COP1 = Carnot COP
COP2 = Design Carnot COP,
$\Psi_{cop}$ = Normalize COP,
$\theta_{norm}$ = Actual normalized COP,
COPAD = Actual design COP.

The last equation normalizes the actual COP to the COP at the design conditions.

Thus, the above algorithms provide a means to calculate the design COP under any off-design conditions.

The constants in the above expressions are obtained from an analysis of literature data for different sized chillers. Since the objective is to determine whether any performance degradation has occurred rather than to calculate the COP, the constants in the above expressions can be nominal. This has been verified using different manufacturers' data or experimental data.

The approach to using the above equations for diagnostics is to determine the design COP on line using actual measurements. This determination is done when it is known that there is no performance degradation in the system. The determined mean COP and the associated standard deviation are calculated and stored in the computer. This calculation establishes the nominal design COP. After a commissioning period, the mean COP and standard deviation are obtained periodically and compared with those stored in the computer.

A statistical test for comparison, such as student-t, is used to determine whether the difference in means or standard deviations is significant.

In a statistical test for diagnostics, a fault or degradation in the chiller will cause the properties of the COP residential to alter, i.e.:

$$r_{old} = COP_{learn} - COP_{design}$$

These alterations can be detected by using statistical tests such as the student-t test of means which is a standard statistical significance test. By definition, the student-t test of means is a comparison of the ensemble of values taken during commissioning that is assumed to be free of malfunctions (ensemble old) and an ensemble taken during a later check (ensemble current).

The null hypothesis to be tested comes from populations with the same means:

$$t = [r_{old} - r_{current}]/(\underline{s} * sqrt(1/n_0 + 1/n_c))$$

$$\underline{s}^2 = [n_0 - 1)s_o^2 + (n_c - 1s_c - 1)c2]/[n_0 + n_c - 2]$$

where:
t = Student-t test factor,
r = Residual,
s = Standard deviation,
n = Number of data points,
o = Old,
c = Current, $[n_o + n_c - 2]$ = Number of degrees of freedom.

The value of t is calculated and compared with the tabulated values at the selected significance or confidence level. In our tests we have used a 99 percent confidence level taken from Standard Mathematical Tables handbook.

In a particular installation $T_{con,D}$ was on the order of 85 degrees Fahrenheit and $T_{chw,D}$ was on the order of 45 degrees Fahrenheit. The coefficients are as follows:

| $a_1 = 0.228$ | $b_1 = 0.998$ | $c_1 = -0.002$ |
|---|---|---|
| $a_2 = 0.957$ | $b_2 = -0.0281$ | $c_2 = 1.401$ |
| $a_3 = -0.184$ | $b_3 = -0.000567$ | $c_3 = -0.398$ |

What is claimed:

1. A method for reducing the coefficient of performance to a design value from measured temperature conditions of a vapor compression type refrigeration system of the type having series arranged compressor, condenser and evaporator units and an electric motor for driving said compressor unit, said system further having a condenser water supply line and evaporator chilled water supply and return lines, said method comprising the steps of:

storing a value (CWF) for the chilled water flow through said condenser;

sensing the condenser water supply temperature ($T_{con}$), sensing the evaporator water supply and return temperatures ($T_{chw,in}$ and $T_{chw,out}$), sensing the power input ($\phi$) to said motor; calculating the cooling load ($Q_c$)* from the expression $Q_c = CWF * (T_{chw,in} - T_{chw,out})$;

storing the manufacturers' performance data for said system comprising the condenser supply water design ($T_{con,D}$) and the evaporator return water design temperature ($T_{chw,D}$);

storing a value ($\alpha_{temp}$) which is the ratio of the required change in condenser temperature to a unit change in chilled water temperature to maintain the same rated chiller capacity;

calculating the equivalent temperature ($T_r$) which compensates for variation from the given design temperatures from the expression
$T_r = (T_{con} - T_{con,D})/\alpha_{temp} - (T_{chw} - T_{chw,D})$, storing experimentally determined coefficients $b_1$, $b_2$, and $b_3$ for the quadratic expression
$\beta cap = b_1 + b_2 * T_r + b_3 * (T_r)^2$ wherein $\beta_{cap}$ is the ratio of the available capacity (CAP) at the actual chilled water and condenser water conditions to the design capacity ($CAP_D$);

calculating said $\beta_{cap}$ and said CAP;

calculating the part-load ratio $\Gamma_{load}$ from the expression $\Gamma_{load}=Q_c/CAP$, storing experimentally determined coefficients $a_1$, $a_2$ and $a_3$ for the quadratic expression $$\delta_{pow}=a_1+a_2*\Gamma_{load}+a_3*(\Gamma_{load})^2$$

wherein $\delta_{pow}$ is a fraction of full-load power, calculating the full-load power (PFL) from the expression $PFL=\phi*\delta_{pow}$; and calculating said COPA from the expression $COPA=CAP/PFL$.

2. A method according to claim 1 for normalizing said COPA from actual to design temperature conditions by using Carnot COPs including the steps of;

calculating the Carnot COP from the expression $$COP1=(T_{con}+460)/(T_{con}-T_{chw});$$

calculating the design COP (COPD) from the expression $$COP2=(T_{con,D}+460)/(T_{con,D}-T_{chw,D}),$$

calculating the normalized COP from the expression $$\Psi_{cop}=COPa/COP2,$$

storing experimentally determined coefficients $c_1$, $c_2$ and $c_3$ for the quadratic expression $$\theta_{norm}=c_1+c_2*\Psi_{cop}+c_3*(\Psi cop)^2$$

wherein $\theta_{norm}$ is the actual normalized COP, calculating said COPAN; and calculating the actual design COP (COPAD) from the expression $COPAD=COPA/\theta_{norm}$, said COPAD being the normalization of the actual full-load COP (COPA) to the COP at design conditions.

3. A method according to claim 1 wherein said $T_{con,D}$ is approximately 85 degrees Fahrenheit and said $T_{chw,D}$ is approximately 45 degrees Fahrenheit.

4. A method according to claim 1 wherein said coefficients are:

| | |
|---|---|
| $a_1 = 0.228$ | $b_1 = 0.998$ |
| $a_2 = 0.957$ | $b_2 = -0.0281$ |
| $a_3 = -0.184$ | $b_3 = -0.000567$ |

5. A method according to claim 2 wherein said coefficients are:
$c_1 = -0.002$
$c_2 = 1.401$
$c_3 = -0.398$.

* * * * *